(12) United States Patent  (10) Patent No.: US 8,240,603 B2
Knightley et al.  (45) Date of Patent: Aug. 14, 2012

(54) MAT FOR REDUCING THE DISTURBANCE OF PARTICULATE MATTER AND LIQUIDS BY WIND

(75) Inventors: Simon Peter Knightley, Victoria (AU); Warren Lachlan McGrettor, Victoria (AU); Gregory Norman Peters, Victoria (AU)

(73) Assignee: C Gear Australia Pty Ltd., Victoria (AU)

( * ) Notice: Subject to any disclaimer, the term of this patent is extended or adjusted under 35 U.S.C. 154(b) by 0 days.

(21) Appl. No.: 13/064,812

(22) Filed: Apr. 18, 2011

(65) Prior Publication Data

US 2011/0247192 A1   Oct. 13, 2011

Related U.S. Application Data

(63) Continuation of application No. 10/578,499, filed as application No. PCT/AU2004/001535 on Nov. 5, 2004, now Pat. No. 7,972,984.

(30) Foreign Application Priority Data

Nov. 5, 2003   (AU) ................................ 2003906097

(51) Int. Cl.
 *B64F 1/00*   (2006.01)
(52) U.S. Cl. ...................... 244/114 R; 244/116; 442/318
(58) Field of Classification Search .............. 244/114 R, 244/116; 442/304, 318; 5/417, 420
See application file for complete search history.

(56) References Cited

U.S. PATENT DOCUMENTS

| | | | |
|---|---|---|---|
| 2,774,127 A | 10/1950 | Secrist | |
| 3,649,724 A | 3/1972 | Rembert et al. | |
| 4,836,472 A | 6/1989 | Sutter et al. | |
| 5,018,230 A | 5/1991 | Steberger | |
| 5,472,458 A | 12/1995 | Ogawa et al. | |
| 5,577,687 A | 11/1996 | Downing | |
| 5,607,742 A | 3/1997 | Ing et al. | |
| 5,870,785 A | 2/1999 | Hoorens | |
| 6,742,203 B2 | 6/2004 | Reynolds | |
| 7,972,984 B2 | 7/2011 | Knightley et al. | |
| 2004/0052999 A1* | 3/2004 | Rogers ........................ | 428/44 |

FOREIGN PATENT DOCUMENTS

DE   28 33 657 A1   2/1980
(Continued)

OTHER PUBLICATIONS

Dec. 1, 2010 Office Action issued in European Application No. 04 796 984.5.

(Continued)

*Primary Examiner* — Timothy D Collins
*Assistant Examiner* — Jamie S Stehle
(74) *Attorney, Agent, or Firm* — Oliff & Berridge, PLC

(57) ABSTRACT

A mat for reducing the disturbance of particulate matter by wind, has a first layer of coarse mesh material, and a second layer of coarse mesh material. The first layer is held in a substantially fixed position relative to the second layer. The mat is particularly suitable for use as a helicopter landing mat, in conditions where dust, sand, snow, water or other particles or liquids might otherwise cause a disturbance resulting in loss of visibility, damage or wear to parts of the helicopter, and injury or damage to nearby people or equipment.

17 Claims, 5 Drawing Sheets

FOREIGN PATENT DOCUMENTS

| | | |
|---|---|---|
| EP | 0 481 840 A1 | 4/1992 |
| EP | 0 481 840 B1 | 4/1992 |
| GB | 738469 | 10/1955 |
| GB | 2 271 326 | 4/1994 |
| JP | A-10-102425 | 4/1998 |
| KR | 1989-2089 | 3/1989 |
| KR | 1998-083256 | 12/1998 |
| SU | 1133370 A | 12/1985 |
| WO | WO 88/05481 | 7/1988 |
| WO | WO 96/01602 | 1/1996 |
| WO | WO 02/39857 A1 | 5/2002 |

OTHER PUBLICATIONS

English translation of Jan. 12, 2011 Office Action issued in Japanese Application No. 2006-538599.
English translation of Jul. 21, 2008 Office Action issued in Korean Application No. 10-2003-7006823.
English translation of Office Action issued in Russian Application No. 2006119634.
Dec. 13, 2004 International Search Report issued in Application No. PCT/AU2004/001535.

* cited by examiner

MAT FOR REDUCING THE DISTURBANCE OF PARTICULATE MATTER AND LIQUIDS BY WIND

This is a Continuation of application Ser. No. 10/578,499 filed Oct. 2, 2006 (now U.S. Pat. No. 7,972,984), which in turn is a National Stage of Australian Application No. AU2004/00153, filed Nov. 5, 2004. The disclosures of the prior applications are hereby incorporated by reference herein in their entirety.

This invention relates to a mat for reducing the disturbance of particulate matter by wind. The mat can also be used for reducing the disturbance of water and other liquids and small solids by wind. The invention relates particularly but not exclusively to a helicopter landing mat suitable for use in areas where there is substantial dust, sand, snow or other particulate matter, or water, mud or other liquid matter. The invention will be described with particular reference to the example case of a helicopter landing mat, but it is to be understood that the invention is applicable to the control of dust and other particles in any windy environment, such as on exposed sand dunes, beaches, snow, and dry soil.

BACKGROUND

Dust and other particulate matter can present significant hazards to the operators of rotary wing aircraft. In this specification "other particulate matter" includes sand, snow, water droplets, stones, pebbles, grass, twigs, soil, litter, and any other small loose items. During take-off and landing, and during near-ground hovering, clouds of dust or other particles can be generated around a helicopter. This can result in loss of visibility or "brown-out" in the case of dust or sand, or "white-out" in the case of snow. Particles can clog the air intakes of an aircraft's engines, resulting in overheating, and fine particles ingested through the engines can cause damage and mechanical failures. Particles can cause accelerated wear-and-tear on rotors and rotor gear. Coarser airborne particles can cause eye injuries and other types of injuries to people near the aircraft, and other aircraft, vehicles, equipment and facilities in the area can be damaged.

Helicopter landing pads are typically constructed from concrete, asphalt, bitumen or another solid surface. When, however, it is necessary to land at a site which does not have a solid landing pad, problems with dust and other particles often arise. One solution has been to create a portable landing pad, and such portable landing pads are typically made from steel or some other strong, and relatively solid and heavy material which is not likely to be blown away by the helicopter's downdraft. However, such landing pads are very cumbersome to move around, and are unsuitable for rapid deployment.

One manner of constructing a short-term helicopter landing pad on a dusty or sandy surface involves spraying the surface with water. The effectiveness of this technique depends on having sufficient water available, and the landing surface ceases to be usable once the water dries, which may only be a matter of minutes in some environments. A longer term landing pad may be created using sump oil, diesel fuel or another non-volatile liquid, but the effectiveness is still short-lived, it is necessary to have a supply of oil or diesel fuel available, and the environmental damage is significant. A more environmentally friendly solution is provided by a product known as Envirotac II, or "Rhino Snot", but this still requires a supply to be available when needed.

Landing pads are typically not made out of cloth materials such as canvas or PVC tarpaulins, because of the dangers associated with the cloth flapping up and getting caught in the helicopter's rotors. Even if a canvas tarpaulin were firmly anchored down on every side, there is still the possibility that in a heavy landing a helicopter's skids or wheels might tear the canvas, especially when the ground contains some exposed rock, and the helicopter's downdraft on the torn portion of the canvas would cause air to flow under the canvas, lifting the canvas, causing additional strain on the anchor points, and accentuating the tear, with the attendant risk that a torn portion of the canvas will be caught up in the helicopter's rotors.

In some military operations, landing mats are made of aluminum sheet (which may be fabric-like, rather than rigid metal). Aluminum is less hazardous than canvas, but there are significant difficulties and dangers experienced with wind getting under the mats, or blowing the mats or pieces of mat around, resulting in injury to people on the ground as well as endangering the helicopter A further problem associated with the use of a flexible landing pad arises from the effect of the helicopter's downdraft on the edges of the landing pad. As the helicopter's downdraft nears the ground, it is directed outwardly, so that the air flow near the edges of the landing pad is rapid and nearly horizontal. The rapidly flowing air on the top side of the landing pad has a lower pressure than the still air on the underside of the landing pad, and this causes the edges of the landing pad to flap up. In the past, this problem has been dealt with by making the edges of the landing pad so heavy that they cannot be moved by the airflow, but this significantly reduces the portability of the landing pad. Alternatively, large, heavy pegs are used to secure the landing pads, but these make the pads less portable and more time-consuming to set up or pack away.

The US Army has used a relatively light-weight temporary road-surfacing type of matting known as "Mobi-Mat," which is a solid plastic material impermeable to air. It is typically stored in large rolls which are bulky and heavy, and in use the mats are held down by 1-meter pegs. Standard mat sizes are 4.2 m wide, 0.4 m thick, and 8 m, 12 m or 20 m long. The 8 m mats weigh 56.5 kg, the 12 m mats weigh 84 kg and the 20 m mats weigh 149 kg. Each mat therefore requires two or more people to carry it.

SUMMARY

According to a first aspect of the present invention, there is provided a mat for reducing the disturbance of particulate matter or liquids by wind, the mat including:

(a) a first layer of coarse mesh material; and (b) a second layer of coarse mesh material;

wherein the first layer is held in a substantially fixed position relative to the second layer.

A mesh material with two or more layers can be constructed using looping, intermittent sewing, stitching or weaving, so that a multi-layer material appears to be a single layer. It is to be understood that such materials are to be regarded as having two or more layers for the purposes of the present invention.

It has been found that a mat with two or more layers of coarse mesh material can be effective in preventing the majority of the particulate matter under the mat from escaping, while at the same time allowing some of the wind to pass through the mat. This reduces the pressure differentials between the top and bottom sides of the mat, making the mat much more likely to resist tears and endure strong winds than a comparable mat made from non-porous cloths such as canvas. Further, a divergent "tumbling" effect of wind striking the surface of the mat appears to be created by the textile pattern of the coarse mesh material, pushing the mat onto the ground rather than creating an "uplift" effect.

The mesh material may be any suitable type of material. It is preferred that the mesh material is a knitted material with average stitch length of between 2 mm and 6 mm, and the average separation between the first and second layer is between 2 mm and 10 mm.

The mesh material may be formed from any suitable type of fibres. Natural fibres such as wool and cotton can be used, but it has been found that particularly desirable results are achieved if the mesh material is formed from plastics fibres.

The porosity of the mesh material, or the proportion of the surface area of the mesh which consists of holes rather than fibres, may have any suitable value. It is preferred that each layer of the mesh material has a porosity of between 10% and 50%.

Wind which strikes the mat will partly pass through the mat and partly be stopped by the mat, so that the windspeed on the downwind side of the mat will be attenuated relative to the windspeed on the upwind side. It is preferred that each layer of the mesh material has a wind attenuation factor of between 40% and 80% for wind directed at right angles onto the mesh material at 50 km/h.

According to another aspect of the invention, there is provided a helicopter landing mat, which includes one or more mats of the type previously defined. The helicopter landing mat further includes a peripheral region which has a greater mass per unit area than the mesh material, and the first layer is attached to the second layer in the peripheral region.

Preferably, the helicopter landing mat has a length and a width which exceed the rotor span of a helicopter.

According to a second aspect of the invention, there is provided a method of reducing the disturbance of particulate matter on a surface by wind, including the steps of:

(a) covering the surface with a mat which has a first layer of coarse mesh material and a second layer of coarse mesh material, the first layer being held in a substantially fixed position relative to the second layer; and (b) fixing the mat to the surface at a plurality of points around the periphery of the mat.

BRIEF DESCRIPTION OF THE DRAWINGS

The invention will now be described in further detail by reference to the attached drawings which show example forms of the invention. It is to be understood that the particularity of those drawings does not supersede the generality of the preceding description of the invention.

DETAILED DESCRIPTION OF EMBODIMENTS

Figure 1:
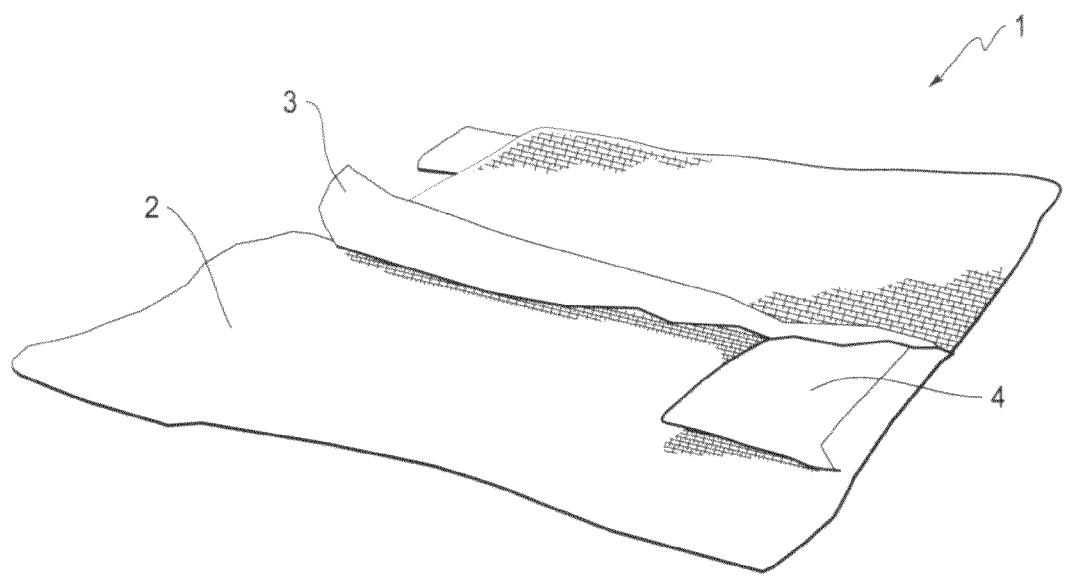
FIG. 1 shows two layers of knitted mesh material in a cut-away corner section of a mat according to an embodiment of the invention.

Referring firstly to FIG. 1, there is shown a cut-away corner section of a mat 1 for reducing the disturbance of particulate matter by wind, according to an embodiment of the invention. The mat includes a first layer 2 of coarse mesh material and a second layer 3 of coarse mesh material. The first layer is held in a substantially fixed position relative to the second layer. Reinforcing material 4 is provided along the edges, although tests have shown that such reinforcing is not essential.

Figure 2:
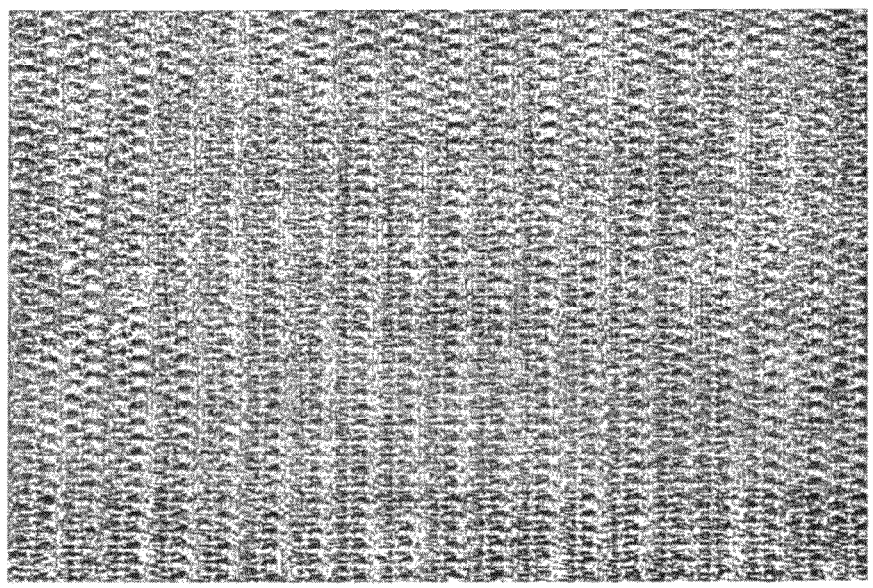
FIG. 2 shows a sample of knitted mesh material suitable for use in an embodiment of the invention.

FIG. 2 provides further detail of a suitable type of mesh material. A preferred type of mesh material is a knitted material with average stitch length of between 2 mm and 6 mm. In the embodiment illustrated, the average stitch length is around 3 mm. The desirable mesh size depends to some extent on the size of the particles, with a finer mesh size being appropriate for finer particles. Knitted material is preferred over woven material because it is less prone to failure if one stitch is torn, and also because it typically allows more appropriately sized and shaped holes. The knitted construction also substantially reduces tearing and the propensity of "runs" to develop once the mat is damaged or cut.

The average separation between the first layer and the second layer is preferably between 2 mm and 10 mm, so that the mat essentially forms a three-dimensional mesh. The mat may include a third and possibly further layers, but there is a trade-off between the desirable characteristics of letting wind pass through from top layer to bottom layer on the one hand, and stopping particulate matter from underneath the mat passing through the layers on the other. The presence of too many layers increases the wind attenuation factor to a figure which is too high for the mesh to function effectively.

The mesh material may be made from cotton or another natural fibre, but in preferred arrangements the mesh material is formed from plastics fibres. Smooth plastics fibres are typically smoother than natural fibres and therefore provide a lower degree of wind resistance, so that the wind attenuation factor is lower.

It is not uncommon for fuel or oil or hydraulic fluid to be spilled on the ground surrounding a helicopter. Accordingly, it is preferred that the mats are made from materials at least somewhat resistant to fuel spills, oil, hydraulic fluid, water and other types of staining and contamination. Further, because of the high temperatures generated around parts of helicopters, flame resistance and/or flame retardant properties are also very desirable.

It is also desirable that mats according to the invention be resistant to the build-up of static electricity. One way of avoiding static electricity involves electrically grounding the mats, such as by means of metal pegs securing the mats to the ground and/or a metal wire traversing the mats.

A mat according to the invention may be any suitable colour. In one preferred arrangement, the colour of the mat is similar to the surrounding terrain, for example a sandy colour for desert situations and green for grassed areas. In another arrangement, the mat is of a contrasting colour to the terrain, so that it can easily be spotted from the air. In another arrangement, a mat is one colour on one side and a different colour on the other side.

The porosity of the mesh material, or the proportion of the surface area of the mesh which consists of holes rather than fibres, is preferably between 10% and 50%. In the embodiment illustrated in FIG. 2, the porosity is around 30%.

The overall wind attenuation factor of the mat will depend on a number of factors, including the smoothness of the fibres used, the size of individual holes (which is related to the stitch length in knitted materials), and the porosity of each layer of the mesh material. The layers may have different wind attenuation factors, but it is preferred that each layer of the mesh material has a wind attenuation factor of between 40% and 80% for wind directed at right angles onto the mesh material at 50 km/h.

The mat of the present invention is suitable for use in numerous different situations to reduce the undesirable effects of dust or other airborne particles. The mat may be used for a helicopter landing mat on dusty ground, sandy ground, or snow, as discussed previously. It may also be used for dust or airborne particle control in large ground expanses such as military camps, refugee camps, outdoor venues (concerts, sporting events, etc), animal enclosures and other situations where dry dusty conditions prevail (especially in droughts).

Because of the degree of wind porosity of mats according to the invention, it is not in all cases essential that the mat be secured to the ground. In tests conducted with a mat on a concrete surface subjected to a simulated helicopter downdraft, there was no flapping around the edges even though the mat was not secured to the ground, and even though the edges of the mat were not made heavier through reinforcing. It will still in most cases be desirable that the mat be fixed to the ground around its periphery, but the degree of securing can in many cases be fairly minimal.

Figure 3:
FIG. 3 shows in schematic form an extendible arrangement of a plurality of mats joined together to form a helicopter landing mat in accordance with an embodiment of the invention.

FIG. 3 illustrates one configuration of a helicopter landing mat, in which a plurality of different mats have been joined together to form one composite mat. Each individual mat in this arrangement includes a peripheral region which has a greater mass per unit area than the mesh material, and the two layers of the mesh material are joined to each other in the peripheral region. Adjoining mats may be secured together in any suitable manner and in any suitable configuration. Suitable securing means include lacing or tying the mats together with rope or wire, hook-and-loop fastening, metal or plastic clips or ties, or tent pegs (which may be flat-topped to minimise protrusions that may interfere with landing helicopters). Desirably, any overlapping edges of adjoining mats (for example when joined by hook-and-loop fastening) are arranged so that the edge of the mat nearest to the centre of the helicopter landing pad overlaps on top of the adjoining mat, so that the downwash moving from the centre of the landing pad towards the edges presses down on the joins.

The helicopter landing mat has a length and a width which exceed the rotor span of a helicopter, ideally by a significant amount, reducing the likelihood of particulate matter surrounding the mat being caught up into a dust cloud. In the example shown in FIG. 3, the composite mat is 21 meters by 21 meters in size, and it is composed of seven smaller mats, the central one of which is 7 meters by 7 meters, the other six each being about 3.5 meters by 14 meters in size. The edging of each mat may be reinforced to allow for the mats to be pulled tight and pegged to the ground, although tests have demonstrated that reinforcing is not essential. Each mat is portable and weighs around 20 to 22 kg, so the total weight is around 190 kg. When the mats are folded, they occupy a total volume of approximately 1 cubic meter. Each mat can be stored in its own bag, which can comfortably be lifted by one or two men. All the mats can be stored in a single carry bag for storage and transit to keep the set together. Alternatively, mats can be folded and/or rolled before being secured by straps and buckles for storage and transportation.

The mats have great tensile strength, and are laid directly on the ground. The central landing mat may be additionally reinforced. The matting can be laid by two people in less than 30 minutes, and packed away by two people in less than an hour. This compares with a set-up time of a few days for previous "portable" structural helicopter landing pads.

The size and weight dimensions of individual mats may vary, depending on mat size and porosity. For example, a single mat may weigh up to 25 kg or more. The sizes and configuration of the mats shown in FIG. 3 are illustrative only. A variety of sizes and configurations can be used depending upon specific situations and requirements, such as the set-up time available and the level of protection required. A mat according to the present invention may be as small as 1 m×1 m or as large as 60 m×60 m, for example. For larger military helicopters such as 'Black Hawks', an overall configuration of around 40 to 50 m×40 to 50 m is desirable, with heavy duty centre landing pad(s) of 12 m×12 m.

One useful configuration is a composite mat measuring 100 ft by 100 ft, made up of 25 mat segments each measuring 6.3 m by 6.3 m and weighing 25 kg. This composite mat can accommodate larger aircraft and gives better protection against higher windspeeds. Having a total weight of around 625 kg, the mat can be laid in less than an hour and packed away in just over an hour by 6 to 8 people. Where less protection is required, or where less time and manpower is available to lay the mat, a different configuration may be used.

In other configurations, all mats making up a landing pad may be of substantially the same size and weight, without any special reinforcing on the centre mat, so that all mats are interchangeable and the respective positions of the mats may be rotated so that the amount of wear on the mats is even. Mats sustaining damage may be swapped with undamaged mats.

In some applications, a square overall configuration of the landing pad is appropriate; in other configurations, the mats may be arranged in a rectangular shape or any other suitable shape.

Although the mats illustrated in FIG. 3 are fixed to the ground by means of pegs, numerous other ways of securing the mats may be used. In sandy and/or dry loose dirt, sandbags, water bladders and other means may be adopted to secure the mats (typically they would already have been tied together) to the ground.

1. Simulation Experiment

Tests were conducted on a sample mat according to an embodiment of the invention. The aim of the testing was to determine the efficiency of the mat in containing particles whilst being subjected to wind velocities comparable with those expected on the ground beneath a military helicopter.

The velocity of the rotor wake of a helicopter depends on the disc loading of the helicopter. Disc loading is the rotor disc area ($\pi R^2$) divided by the gross weight of the helicopter. As a general rule, the downwash of the helicopter increases with the size of the helicopter. For a Sikorsky S-76C helicopter at maximum gross weight of 5,320 kg, the disc loading is 37.6 kg/m$^2$. This gives rise to a downwash velocity at the rotor plane of around 45 km/h. As the flow descends below the helicopter, it accelerates, reaching a maximum speed of about twice the velocity at the rotor plane, or about 90 km/h, at a distance of approximately one rotor diameter below the rotor. The test therefore aimed to reach or exceed this wind velocity.

Particles were pre-weighed and then evenly distributed over an area of 1.4×1.7 meters. This was then covered by the mat which was taped in place. The mat was then subjected to a wind blast for 60 seconds from a height of 80 cm by an air blast machine delivering a rated wind velocity of 145 mph. The mat was then carefully removed and the particulate matter recovered and weighed to determine the amount of matter that has been displaced from beneath the matting.

As a control measure and for comparative assessment, the test was repeated without the mat. The testing was conducted for both fine and coarse particulate matter. Common flour was used as the fine particles and beach sand was used for the coarse particles.

The test results are presented in the tables below:

|  | Qty Grams |
| --- | --- |
| Sand Test |  |
| Start quantity | 1128.00 |
| After Blow | 1103.00 |
| Loss of Sand | 25.00 |
| Percentage Loss | 2.22% |
| Sand Control Test—No Mat |  |
| Start quantity | 1128.00 |
| After Blow | 231.00 |
| Loss of Sand | 897.00 |
| Percentage Loss | 79.52% |
| Relative Efficiency | 97.21% |
| Dust Test |  |
| Start quantity | 282.00 |
| After Blow | 248.00 |
| Loss of Dust | 34.00 |
| Percentage Loss | 12.06% |
| Dust Control Test—No Mat |  |
| Start quantity | 282.00 |
| After Blow | 45.00 |
| Loss of Dust | 237.00 |
| Percentage Loss | 84.04% |
| Relative Efficiency | 85.65% |

The results of the test appear to indicate that the mat is effective in reducing the incidence of both airborne sand and airborne dust, with the matting being more effective in reducing the incidence of airborne sand.

2. Field Trials

Mats made according to the invention were then tested using a number of different types of helicopters, including a Bell 206B "Jetranger", a Eurocopter AS350B "Squirrel", a Bell UH-1N "Huey", a Sikorsky UH-60L "Black Hawk", and a Sikorsky CH-53E "Super Stallion".

Figure 4:
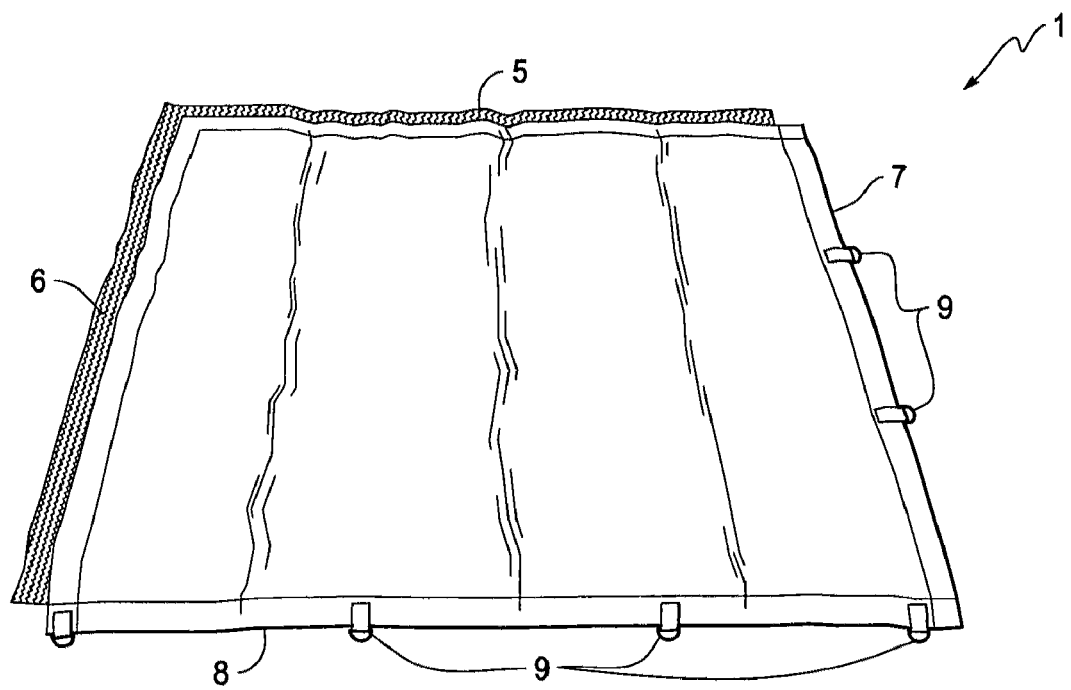
FIG. 4 shows a mat in accordance with an embodiment of the invention.
Figure 5:
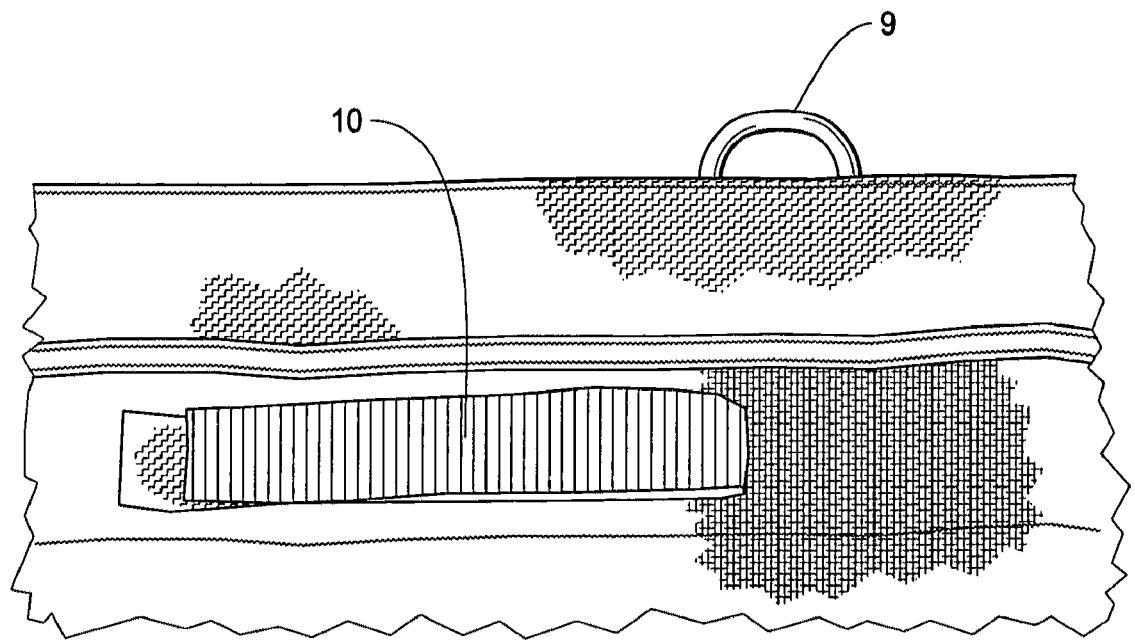
FIG. 5 shows a detail of the mat of FIG. 5.

The type of construction used for the mats is illustrated in FIGS. 4 to 8. FIG. 4 shows a mat 1 which attaches to neighbouring mats by means of hook-and-loop type fasteners. Two sides 5 and 6 of mat 1 have upwardly facing protruding loop edges, whilst the other two sides 7 and 8 have downwardly facing hook edges. Regularly spaced around the edges are D-rings 9, which can interact with straps 10 (see detail in FIG. 5) on adjacent mats to help secure neighbouring mats together, and they can also be used to peg the edges of the mats to the ground. Strap 10 folds back on itself and is held in place by a hook-and-loop type fastening arrangement.

Figure 6:
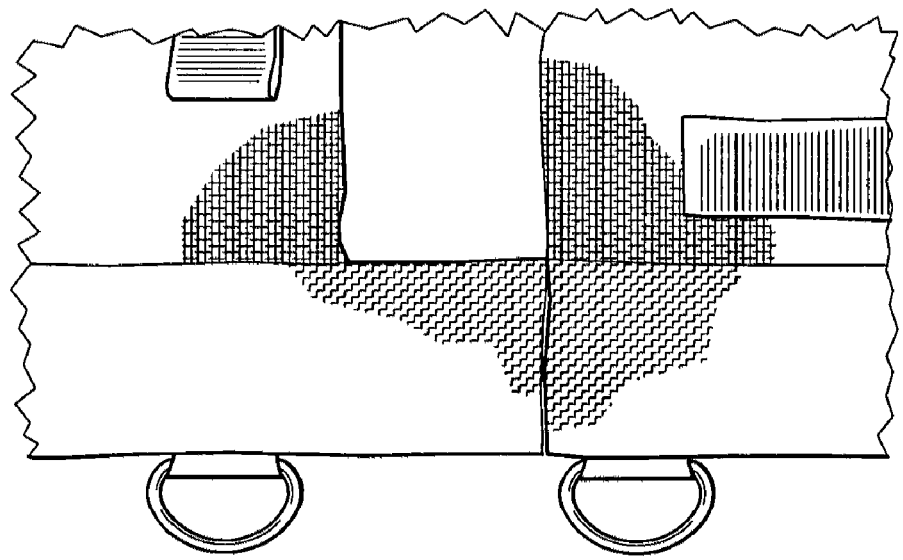
FIG. 6 shows a detail of two mats of the type shown in FIG. 5 joined together.
Figure 7:
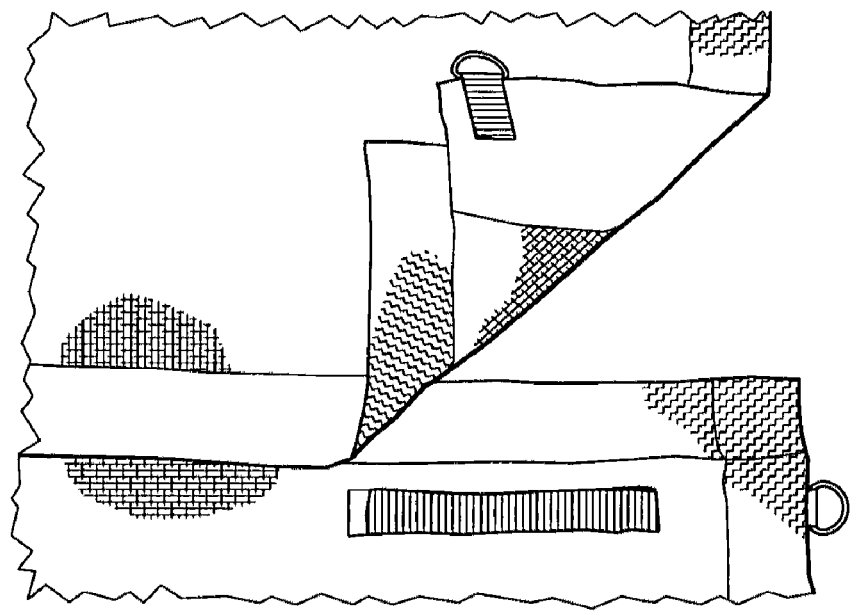
FIG. 7 shows a detail of two mats of the type shown in FIG. 5 joined together.
Figure 8:
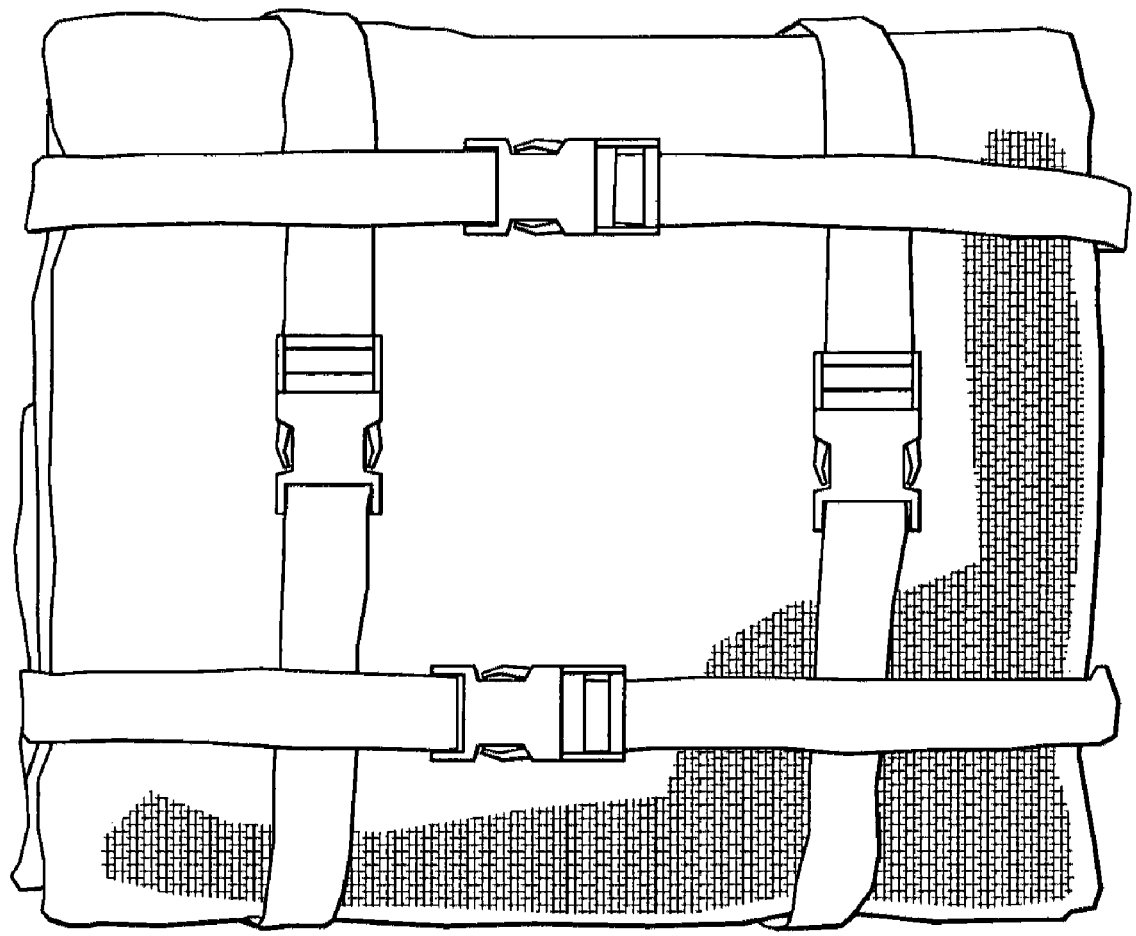
FIG. 8 shows an arrangement for a mat according to the present invention when packed away.

FIGS. 6 and 7 show details of two adjacent mats joined together. FIG. 8 shows a corner of one mat peeled back.

FIG. 8 shows the mat folded up and held together with adjustable-length straps.

It will be appreciated that the embodiments of mats illustrated allow for very rapid deployment of the mats, in a manner which is efficacious in a broad variety of conditions and temperatures. In a typical deployment, the mats need only be rolled out beside each other, with matching hooks and loops pressed together, and with the external periphery pegged to the ground. Where additional security is required, straps 10 may be used in conjunction with rings 9 to strengthen the join between adjacent mats, and mats may be pegged to the ground at points internal from the periphery of the landing pad.

Compared with other types of helicopter landing surface, the mats are considerably more compact and lightweight. The amount of anchoring required is less, and these factors all help to make set-up and tear-down considerably faster than with other types of landing surfaces.

As an optional feature, the mats may have quick-release straps which enable detachment of the mats from anchors for rapid pack-up.

Field trials were conducted with the afore-mentioned helicopters. Firstly, some sand was placed on a relatively firm surface underneath a set of landing mats made according to the invention, and the Jetranger and Squirrel helicopters were made to land on, manoeuvre round, and take off from the landing mats. None of the sand came up through the mats during the tests, and there was minimal movement in the mats even when a helicopter approached and moved around the perimeters of the mats.

When sand was placed on top of a mat, the wake of a helicopter pushed it down through the mat, where it stayed for the rest of the trial.

Further tests were then done in a soft dusty environment, using the Huey, Black Hawk and Super Stallion helicopters. When the Super Stallion helicopter is landing in the dusty area with no mats, the dust storm created by the downwash of the helicopter makes it almost impossible to see the helicopter.

When the same helicopter is landing in the same location, with a landing pad formed from a set of mats according to the present invention, there is some dust visible behind the helicopter, having been stirred up as the helicopter approached the landing pad; nonetheless, visibility is vastly improved, and there is no dust at all over the landing pad.

When the Super Stallion helicopter is hovering some distance above the landing pad, airborne dust is visible around the periphery of the landing pad, but none is coming through the mesh of the landing pad. The landing pad in question was designed for a helicopter with a smaller rotor span. In the present case, the dimensions of the landing pad were approximately equal to the dimensions of the rotor span, whereas it is preferable that the dimensions of the landing pad be at least 1.5 times the dimensions of the rotor span.

Impressions were made in a mat by the skid of the Huey helicopter. The ground underneath the mat was soft and dusty, and the flexible nature of the mat allowed the helicopter skid to sink a little way into the ground without causing damage to the mat. The Huey helicopter had a weight of around 4 tonnes.

Similar indentations were caused by a wheel of the Black Hawk helicopter. The Black Hawk helicopter had a weight of around 6 tonnes. The Super Stallion helicopter had a weight of about 20 tonnes.

The flexibility of the mats of the present invention also gives them a degree of resistance to foreign object damage. The mats will tend to flex around foreign objects, rather than tearing. Advantageously, the mesh construction reduces the risk of tearing or the formation of runs so that a mat can still be used when cut or damaged.

When mats do incur damage, they can be repaired relatively easily by sewing up tears or replacing broken anchor points. The mats can be supplied together with field repair kits.

Further testing has revealed that mats made according to the present invention are also useful when landing on muddy surfaces. The test show that water filters up through the mats, but mud is predominantly contained beneath. High traffic landing areas which would normally be churned to deep mud are substantially protected by the mats.

It is to be understood that various alterations, additions and/or modifications may be made to the parts previously described without departing from the ambit of the invention.

What is claimed is:

1. A method of preparing a site having an unimproved surface to support helicopter launch and landing operations, comprising:
   transporting a plurality of human-portable mats to a site having an unimproved surface, the unimproved surface formed substantially of particulate matter, each of the plurality of human-portable mats comprising a first wind permeable layer and a second wind permeable layer, each wind permeable layer being formed of a mesh material, the first wind permeable layer being held in a substantially fixed position on top of the second wind permeable layer without an intervening layer therebetween, the first wind permeable layer being attached to the second layer in a peripheral region of each of the plurality of human-portable mats;
   covering the unimproved surface of the site with the plurality of mats by laying the plurality of human-portable mats beside each other on the particulate matter; and
   securing adjoining human-portable mats of the plurality of human-portable mats to each other at edges of the plurality of human-portable mats to form a composite mat to support helicopter launch and landing operations,
   wherein the mats are effective in preventing a majority of the particulate matter under the mats from passing through the mats while allowing a portion of wind generated by a helicopter using the composite mat to pass through the mats to reduce a pressure differential that would occur between upper and lower surfaces of a non-permeable mat and thereby substantially avoid flapping of edges of the composite mat caused by the wind generated by the helicopter.

2. The method according to claim 1, wherein the peripheral region of each of the plurality of human-portable mats has a greater mass per unit area than the mesh material.

3. The method according to claim 1, wherein the adjoining human-portable mats are secured to each other by cooperating hook-and-loop fastening surfaces.

4. The method according to claim 1, further comprising:
   at least one of folding or rolling the plurality of human-portable mats prior to the transporting; and
   at least one of unfolding or unrolling the plurality of human-portable mats prior to being laid beside each other.

5. The method according to claim 1, further comprising:
   pegging a periphery of the composite mat to the unimproved surface.

6. The method according to claim 5, further comprising:
   pegging the composite mat to the unimproved surface at points internal from the periphery of the composite mat.

7. The method according to claim 1, wherein at least some of the plurality human-portable mats include rings spaced around the edges of the at least some of the plurality of human-portable mats, the rings being adapted to cooperate with straps on at least another adjoining human-portable mat of the plurality of human-portable mats to assist in securing adjoining human-portable mats to each other.

8. The method according to claim 1, wherein the composite mat has a size of at least 49 square meters.

9. The method according to claim 1, wherein the composite mat comprises at least nine human-portable mats.

10. The method according to claim 1, wherein each of the plurality of human-portable mats weighs less than 25 kg.

11. The method according to claim 1, wherein the first wind permeable layer and the second wind permeable layer of mesh material each comprise a knitted material with an average stitch length of between 2 mm and 6 mm.

12. The method according to claim 1, wherein an average separation between the first wind permeable layer and the second wind permeable layer is between 2 mm and 10 mm.

13. The method according to claim 1, wherein each of the first wind permeable layer and the second wind permeable layer of mesh material has a porosity of between 10% and 50%, the porosity being a proportion of a surface area of the mesh material which consists of holes rather than of fibers.

14. The method according to claim 1, wherein each of the first wind permeable layer and the second wind permeable layer of mesh material has a wind attenuation factor of between 40% and 80% for wind directed at right angles onto the mesh material at 50 km/h based on an average stitch length, an average separation and a porosity of the first wind permeable layer and the second wind permeable layer.

15. The method according to claim 1, wherein the particulate matter is sand.

16. The method according to claim 1, wherein the composite mat is configured to remain substantially undisturbed during the helicopter launch and landing operations.

17. The method according to claim 1, wherein a configuration of the composite mat substantially suppresses disturbance of the particulate matter underlying the composite mat during the helicopter launch and landing operations.

* * * * *